United States Patent [19]

Cazanove

[11] 4,010,452

[45] Mar. 1, 1977

[54] ASSOCIATIVE DATA PROCESSING APPARATUS AND METHOD

[75] Inventor: Jean Cazanove, Barentin, France

[73] Assignee: Burroughs Corporation, Detroit, Mich.

[22] Filed: Sept. 16, 1975

[21] Appl. No.: 613,906

[30] Foreign Application Priority Data

Oct. 15, 1974   France ............................ 74.34590

[52] U.S. Cl. .......................................... 340/172.5
[51] Int. Cl.$^2$ ....................................... G06F 9/00
[58] Field of Search ............................. 340/172.5

[56] References Cited

UNITED STATES PATENTS 3,105,143   9/1963   Hosier ......................... 340/172.5

OTHER PUBLICATIONS

Belady et al., "Computer Performance Measurements," *IBM Technical Disclosure Bulletin*, vol. 16, No. 2, July 1973, pp. 455–456.

*Primary Examiner*—Raulfe B. Zache
*Attorney, Agent, or Firm*—Dale V. Gaudier; Benjamin J. Barish; Kevin R. Peterson

[57] ABSTRACT

The invention relates to a novel apparatus and method for processing data.

According to the invention, the data processing is performed by association between unmasked association-field bits of the instruction word and previously assigned flags, the instructions being executed conditionally upon finding a match between the two, or unconditionally if all the association-field bits are masked.

The invention may be used to provide a large and flexible capability as to the different programs that can be executed with a limited amount of hardware. It may also be used for multiprocessing and for accomodating future extension units without modification of the internal memory, by including Poll and Select Instructions, to poll the status (connection and availability) of specified extension units, and to select same for activation.

23 Claims, 8 Drawing Figures

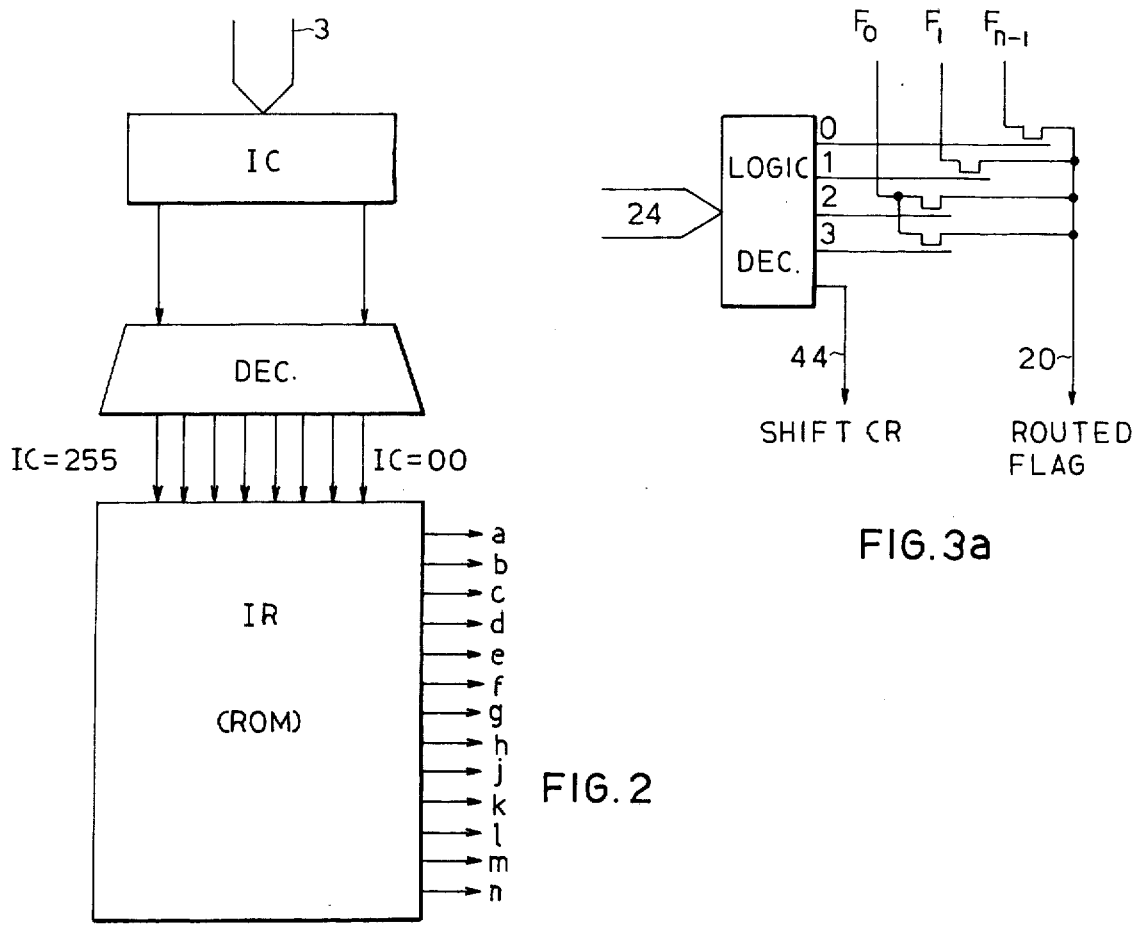
FIG. 2
FIG. 3a
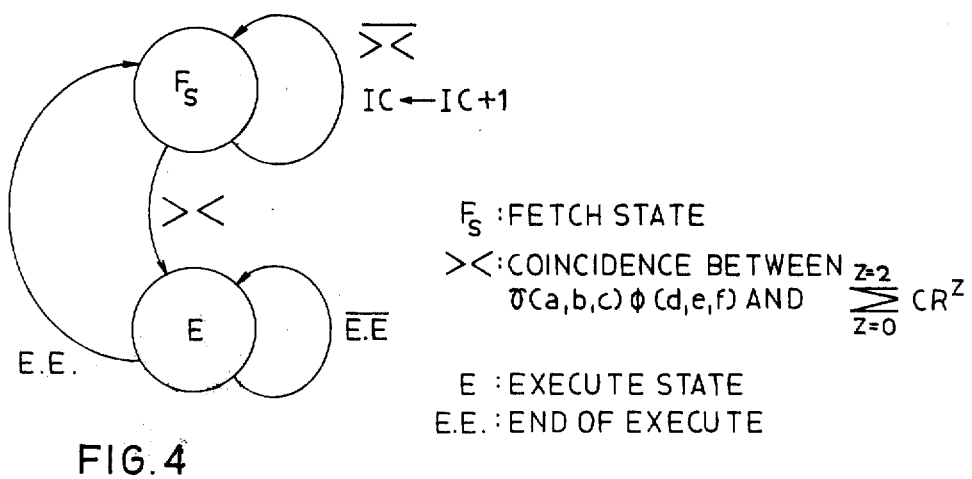
$F_s$ : FETCH STATE
$><$ : COINCIDENCE BETWEEN $\sigma(a,b,c) \phi (d,e,f)$ AND $\sum_{z=0}^{z=2} CR^z$
E : EXECUTE STATE
E.E. : END OF EXECUTE
FIG. 4

ASSOCIATIVE DATA PROCESSING APPARATUS AND METHOD

BACKGROUND OF THE INVENTION

The present invention relates to data processing, and particularly to a novel apparatus and method for processing data by association.

Conventional data processing systems include a memory for storing the program as a series of instructions to be executed, each instruction usually comprising an operation portion and one or more address portions. The operation portion designates the operation to be performed, and the one or more address portions designate the location of the stored reference information to be used in the operation involved, or the location at which one or more results of the operation are to be stored, or the location of the next instruction to be read from the program memory. In micro-programmed computers, which are coming into widespread use, each instruction (macro-instruction) initiates the execution of a sequence of more elementary instructions (micro-instructions), the latter commonly being stored in a Read-Only-Memory (ROM).

Some of the instructions in a data processor are to be executed unconditionally, while others are to be executed conditionally; for example, the execution of an instruction may be conditional upon the status of an independent variable represented by the state of one of the flip-flops provided in the processor for this purpose. An example of a conditional instruction is a "Conditional Jump", commanding a jump or transfer to a specified address if a specified condition is present as manifested by a status flip-flop. Thus, when the data processor is to perform a task involving a large number of instructions, some of which are conditional and others of which are unconditional, the processor first determines the status of the different independent variables involved in the series of instructions, and then uses this information in order to execute the respective instructions. The usual procedure for accomplishing this requires the use of a substantial amount of hardware and also requires a substantial amount of time because of the large number of instructions of micro-instructions which have to be generated to complete the process.

In addition, once a data processor has been programmed for a particular job, any subsequent changes in the job or in the data processing system, for example to accommodate a new extension data processing unit, can involve substantial outlays of time and money in altering the program and debugging it; and if the program is stored in a ROM, the outlay of time and money is even further increased because of the need to remetallize and debug the ROM.

BRIEF SUMMARY OF THE PRESENT INVENTION

In the present invention, the processing is performed by association using one or more of the independent variables of the machine, such as one or more of the status flip-flops which are assigned as flags for the association. The association is made between certain bits of the instruction word and the previously assigned flags, and the data processor executes these instructions conditionally, i.e. only when the association specified by the respective instruction word matches the previously assigned flags. The processor can also execute instructions unconditionally, this being effected by the provision of masking bits in the instruction word, which bits can be used to mask or override any one or all of the association bits.

More particularly, the present invention provides data processing apparatus having the ability to process by association, comprising:

A. A control unit for receiving instructions and controlling the execution thereof;

B. flag register means for registering one or more flag criteria;

C. an instruction register for storing a series of multi-bit instruction words each including:
  i. an association field of one or more bits for designating the one or more flag criteria;
  ii. a masking field of one or more bits for designating the flag criteria to be honored by unmasking the respective association-field bit, and the flag criteria to be ignored by masking the respective association-field bit;
  iii. and an operation field of a plurality of bits for designating a particular data processing operation;

D. an instruction register addressing means for addressing the instruction register to read out the instruction words therefrom;

E. flag comparator means comparing the flag criteria registered in the flag register means with the unmasked association-field bits of each instruction word read out of the instruction register; and F. instruction execution means controlled by the control unit to execute the operation designated in the instruction word upon the finding by the comparator means of a match between the unmasked association-field bits of the instruction word and the flag criteria registered in the flag register means.

According to another feature of the invention, the flag register means (B) includes:
  i. one or more flag bistable devices each conditionable to one of its stable states upon command from an instruction word;
  ii. and one or more comparison registers for registering the state of the flag bistable device or devices upon command from another instruction word.

According to a further feature, the flag register means (B) includes a plurality of $n$ flag comparison registers for registering up to $n$ flag criteria, the association and masking fields of the instruction word each also including $n$ bits, one for each flag criterion.

According to a still further feature, there are a plurality greater than $n$ of flag bistable devices each assignable to one of the flag comparison registers upon command from an instruction word.

In the preferred embodiment of the invention described below, $n$ equal 3; that is, each instruction word includes three bits in the association field and three bits in the masking field. The number of assignable flag bistable devices, however, greatly exceeds 3, there being up to 16 such devices in the example described. Each instruction word further includes seven bits in the operation field, so that each instruction word comprises 13 bits altogether.

It will thus be seen that in the data processor of the present invention, the execution of the commanded operation does not depend on the selected address of the instruction, but rather depends on the content of the address. Such a content-addressable processor will thus execute only those instructions where the unmasked association bits in the instruction word match the previously assigned flags. Instructions may also be executed unconditonally, by masking all the association bits. Such an arrangement provides a very large and flexible capability as to the different programs that can be executed with a limited amount of hardware, and reduces the number of micro-commands and the amount of hardware and time required to complete the data processing task.

The invention may also be used in a system including a master data processor controlling one or more extension data processing units. One application of this aspect of the invention is to accommodate a future extension data processing unit without modification of the internal memory of the master data processor, thereby avoiding the costs in time and money normally involved in altering and debugging the program. Thus, a system can be designed to talk to extension units which are not then connected, or which may not even be available, but which may be connected later. Another application of such a system is in multi-processing.

The foregoing aspects of the invention are attainable by an arrangement which uses a Poll Instruction and a Select Instruction stored in the internal memory. The arrangement is such that the Poll Instruction effects a poll of a specific extension unit to determine whether it is connected in the system and whether it is available for a data processing task, and the Select Instruction selects a polled extension unit which has been connected and found available.

According to the foregoing aspect of the invention, therefore, there is provided a data processing system comprising a master data processor having the features described above, and one of more extension data processing units;

the instruction register of the master data processor having means for storing multi-bit instruction words designating a Poll Instruction commanding the poll of a specified extension unit, and a Select Instruction commanding the selection of a specified extension unit;

each of the extension units including responding means effective upon the execution of a Poll Instruction by the master data processor to register, as the flag criteria in the flag register means of the master data processor, the connection of the polled extension unit and its availability for data processing, thereby enabling the master data processor to execute a subsequent Select Instruction upon the finding by the master data processor flag comparator means of a match between the unmasked association-field bits of a Select Instruction and said flag criteria registered in the flag register means.

In the embodiment of the invention described below to illustrate this feature, the responding means of the extension unit includes:

bistable devices settable to states indicating whether or not the respective extension unit is connected in the system and is available for data processing;

and means, effective upon the execution of a Poll Instruction by the master data processor, for registering in the flag comparator means of the master data processor, the states of the polled extension unit bistable devices.

According to a further aspect of the invention, there is provided a method of processing data by association, comprising the steps of:

A. storing a series of multi-bit instruction words each including:
  i. an association field of one or more bits for designating one or more flag criteria;
  ii. a masking field of one or more bits for designating the flag criteria to be honored by unmasking the respective association-field bit, and the flag criteria to be ignored by masking the respective association-field bit;
  iii. an instruction field of a plurality of bits for designating a data processing operation;

one or more of said instruction words designating an operation to register one or more flag criteria;

B. reading out said instruction words in time sequence;

C. registering said one or more flag criteria when the respective instruction word is read out;

D. comparing the registered one or more flag criteria with the unmasked association bits in each instruction word;

E. and executing the operation designated by the instruction word only where there is a match between the unmasked association bits of the respective instruction word and the registered flag criteria.

According to a still further aspect, the foregoing method is characterized in:

a. including in the series of instruction words stored in step (A), a Poll Instruction commanding the poll of a specified extension unit, and a Select Instruction commanding the selection for activation of a specified extension unit;

b. upon the read-out in step (B) of a Poll Instruction, producing a response indicating whether or not an extension unit specified in the Poll Instruction is connected in the system and whether or not it is available for data processing;

c. registering said response to constitute said one or more flag criteria in step (C);

d. upon the read-out in step (B) of a subsequent Select Instruction, comparing said registered response in step (D) with the unmasked association-field bits of the Select Instruction;

e. and executing in step (E) the Select Instruction upon finding a match between the unmasked association-field bits of the Select Instruction and said registered flag criteria.

Further features and advantages of the invention will be apparent from the description below.

BRIEF DESCRIPTION OF THE DRAWINGS

To aid in better understanding the invention, it is herein described, by way of example only, with reference to two preferred embodiments thereof illustrated in the accompanying drawings, wherein:

FIG. 1a illustrates a one-word instruction and FIG. 1b illustrates a two-word instruction used in the apparatus of FIG. 1;

FIG. 2 is a block diagram of the instruction register portion of the system of FIG. 1;

FIG. 3a is a block diagram illustrating the Logic Decoder and Router of FIG. 3;

FIG. 4 is a state diagram illustrating the operation of the processor.

Figure 1:
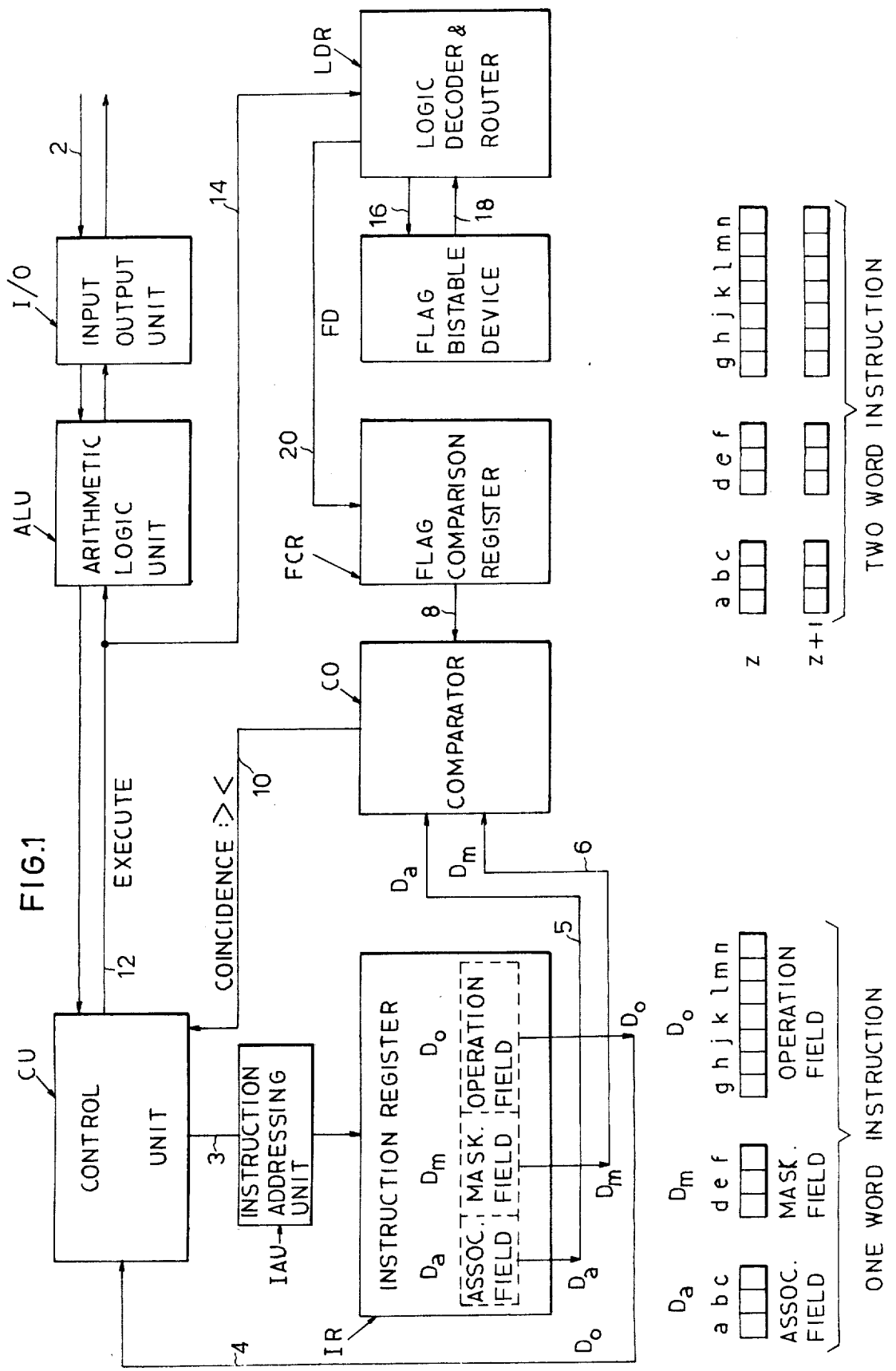
FIG. 1 is a block diagram illustrating a data processor capable of processing by association in accordance with the present invention.

DESCRIPTION OF A PREFERRED EMBODIMENT ILLUSTRATING BASIC ASSOCIATIVE PROCESSING TECHNIQUE

Instruction Word Structure (FIGS. 1a, 1b)

In the preferred embodiment of the invention described below, the instructions are in the form of multi-bit words each including an association field of one or more bits for designating various flag criteria, a masking field of one or more bits for designating the flag criteria to be honored (by unmasking the respective association-field bit) and the flag criteria to be ignored (by masking the respective association-field bit), and an operation field of a plurality of bits for designating a data processing operation. In the described example, each instruction word includes 13 bits, there being three bits in the association field, three bits in the masking field, and seven bits in the operation field.

A one-word instruction is illustrated in FIG. 1a, and a two-word instruction (the two words being stored in successive addresses) is illustrated in FIG. 1b.

The instruction words may be stored in a Random-Access-Memory (RAM) or a Read-Only-Memory (ROM), the latter being illustrated in the example described below.

The three bit positions a–c constitute the association field of the instruction word and may be used to designate up to three flag criteria to be matched by previously-assigned flags as a condition for the execution of the operation or command designated by the respective instruction word. As an example, a 1 in bit position a, and a 0 in bit positions b and c, may designate that the flag assigned to bit position a is to be in its "set" condition, and the flags assigned to bit positions b and c are to be in their "reset" condition in order for the respective operation to be executed; if any one of the foregoing conditions is not found to be true (and the untrue condition is not masked by the data in the masking field as described below), the operation designated in the instruction word will not be executed.

The three bit positions d–f constitute the masking field, there being one such position for each bit position in the association field. The masking field bits enable the processor to ignore one or more of the association-field bits. Thus, if all the association-field bits are designated to be ignored, the instruction word becomes an unconditional one, rather than a conditional one, and calls on the processor to execute the operation unconditionally, i.e., irrespective of what conditions are designated in the association field. In the example described below, a 1 masking-field bit masks the corresponding association-field bit, i.e. tells the processor to override or ignore what is designated in the corresponding association-field bit; whereas a 0 masking-field bit unmasks the corresponding association-field bit, i.e. tells the processor to honor what is designated in the corresponding association-field bit.

The remaining bit positions g–m constitute the operation field of the instruction word, and designate the operation or command to be performed if the unmasked association bits in the instruction word are matched by the assigned flag criteria. If a match is not found, the designated operation is not executed, but rather the processor proceeds to the next instruction word.

The foregoing can be expressed in Boolian terms by Tables 1 and 2 below, wherein $|F\alpha|$, $|F\beta|$, and $|F\gamma|$ are the three independent variables which determine the association required to be met before the operator will execute the operation specified in the instruction word.

TABLE 1

| $F\alpha$ | $F\beta$ | $F\gamma$ |
|---|---|---|
| 0 | 0 | 0 |
| 0 | 0 | 1 |
| 0 | 1 | 0 |
| 0 | 1 | 1 |
| 1 | 0 | 0 |
| 1 | 0 | 1 |
| 1 | 1 | 0 |
| 1 | 1 | 1 |

TABLE 2

| $F\alpha$ | $F\beta$ | $F\gamma$ |
|---|---|---|
| $\phi$ | $\phi$ | $\phi$ |
| $\phi$ | $\phi$ | 0 |
| $\phi$ | $\phi$ | 1 |
| $\phi$ | 0 | $\phi$ |
| $\phi$ | 1 | $\phi$ |
| 0 | $\phi$ | $\phi$ |
| 1 | $\phi$ | $\phi$ |
| 1 | $\phi$ | 1 |
| 1 | $\phi$ | 0 |
| 0 | $\phi$ | 1 |
| 0 | $\phi$ | 0 |
| $\phi$ | 1 | 1 |
| $\phi$ | 1 | 0 |
| $\phi$ | 0 | 1 |
| $\phi$ | 0 | 0 |
| 1 | 1 | $\phi$ |
| 1 | 0 | $\phi$ |
| 0 | 1 | $\phi$ |
| 0 | 0 | $\phi$ |

Table 1 illustrates the eight possible associations that can be designated by the association field bits a–c, and Table 2 illustrates how any one or all of the latter bits can be masked by a masking-field bit d–f (a masked bit being indicated by the "don't care" or "indifferent" symbol 0). A total of 27 different possible associations are thus provided when using three assignable flags.

Of the 27 possible associations illustrated in Tables 1 and 2, the only one which designates an unconditional execution of the operation in the instruction word is the first one of Table 2, wherein all the association-field bits are masked, as indicated by three 0 symbols; all the other associations designate a conditional execution, i.e. conditional on a match between the unmasked association-field bits and the assigned flags.

It will be appreciated that a larger or smaller number of flags, association-field bits, and masking-field bits could be used to provide a larger or smaller number of possible associations for any particular application.

The Basic Associative Processing Technique

Briefly, the data processing is effected in the present invention by associating unmasked association-field bits of the instruction word with assigned flag criteria (the latter being manifested by previously-assigned states to selected status flip-flops of the processor), and executing the instruction only where there is a match.

More specifically, a series of multi-bit instruction words, each word being of the above-described structure, is stored in a memory and is read out in time sequence. One or more of the instruction words are used to designate an operation to register one or more flag criteria, each such flag criterion being registered when the respective instruction word is read out. Selected flag criteria are then assigned by registering them in a flag comparison register by means of another instruction. As each subsequent instruction is read out, the unmasked association-field bits of the instruction word are compared with the assigned flag criteria registered in the flag comparison register, and the operation or command designated by the respective instruction word is executed only if a match is found; if no match is found, the operation is not executed, and the processor proceeds to the next instruction word.

Thus, the exeucution of an operation or command is not performed by the selection of an instruction word address as in a conventional data processor, but rather its execution is conditioned upon the content of the address, i.e. whether there is a match between the flag criteria previously assigned to the flag comparison register, and the unmasked association-field bits of the instruction word at the respective address. In this manner, the processor locates and executes only the instructions to be executed, and executes these instructions in the proper sequence, while ignoring the instructions not to be executed. As indicated earlier, such a content-addressable processor significantly reduces the number of instructions (or micro-instructions) to be executed, and also the amount of hardware and time necessary to complete the processing task.

As an example, there will be considered below the case where the data processor has three independent variables (flag criteria) manifested by three flag bistable devices in the form of status flip-flops $F_o$, $F_1$, $F_n$, each of which can be set or reset independently by an instruction. In this example, the processor includes a plurality of status flip-flops $F_o$, $F_1$, — $F_n$ (e.g. 16), three of which ($F_o$, $F_1$, $F_n$) are to be used as assignable flags. Assume that the first two instruction words of the stored program are unconditional commands which set flip-flops $F_1$ and $F_n$, so that after the second instruction word, the states of the three flip-flops are $F_o = 0$, $F_1 = 1$, and $F_n = 1$. Assume then that the next (third) stored instruction word is an unconditional assign command, assigning the states of these three flip-flops to the flag comparison registers, so that the above states of the three flag flip-flops are transferred to the flag comparison registers.

Now let us take for this example the case where the next 10 instruction words (namely instruction words 4–13) are as set forth in Table 3 below:

TABLE 3

| IC | a b c | d e f | g h j k l m n | Operation |
|----|-------|-------|---------------|-----------|
|    | ($F_nF_1F_o$) | | | |
| 04 | 1 1 1 | 0 0 0 | | If $F_o\Delta F_1\Delta F_n$ execute g-n |
| 05 | 0 1 1 | 0 0 0 | | If $F_o\Delta F_1\Delta F_n/$ execute g-n |
| 06 | 1 0 0 | 0 0 0 | | If $F_o/\Delta F_1/\Delta F_n$ execute g-n |
| 07 | φ φ 1 | 1 1 0 | | If $F_o$ execute g-n |
| 08 | φ 0 1 | 1 0 0 | | If $F_o\Delta F_1/$ execute g-n |
| 09 | 1 φ φ | 0 1 1 | | If $F_n$ execute g-n |
| 10 | φ 1 0 | 1 0 0 | | If $F_o/\Delta F_n$ execute g-n |
| 11 | 0 φ φ | 0 1 1 | | If $F_n/$ execute g-n |
| 12 | φ 1 0 | 1 0 0 | | If $F_o/\Delta F_1$ execute g-n |
| 13 | φ 1 1 | 1 0 0 | | If $F_o/\Delta F_1$ execute g-n |

In this example, the association-field bit $a$ designates the required status of flip-flop $F_n$ as assigned to the flag comparison register, bit $b$ designates the required status of flag $F_1$, and bit $c$ designates the required status of flag $F_o$. In addition, the masking-field bits $d$–$f$ designate by a 0 that the respective association-field bit is to be honored (unmasked), and by a 1 that it is to be ignored or overridden (masked), so that the respective association-field bit can be designated by the "don't care" symbol 0. The operation-field bits $g$–$n$ designate the operation or command to be executed upon a match being found between the unmasked association-field bits and the assigned flags as appearing in the flag comparison registers: a positive flag symbol (e.g., $F_o$, instruction word 4) designates that the respective flag must be in its "set" or 1 condition; a negative flag symbol (e.g., $F_n/$, instruction word 5) designates that the respective flag must be in its "reset" or 0 condition; and the symbol Λ designates that an AND relationship must be present for the designated operation to be executed.

It will be seen that when the assigned flag criteria are $F_o = 0$, $F_1 = 1$, and $F_n = 1$, as set forth above, only the operations or commands designated in the instruction words of addresses 9, 10 and 12 will be executed, while those of the other instruction words will be ignored.

General Layout of Apparatus (FIG. 1)

FIG. 1 illustrates in generalized form the block diagram of a data processing apparatus having the ability to process data in accordance with the above-described associative technique.

As shown in FIG. 1, the control unit CU of the processor receives data from the Input-Output Unit I/O via input line 2 and Arithmetic Logic Unit ALU, it being appreciated that the invention is also useful in data processing systems not including an Arithmetic Logic Unit. The program is stored in the form of a series of instruction words in an Instruction Register IR, each instruction word having the structure described above, namely including an association field Da, a masking field Dm, and an operation field Do. The Instruction Register IR is addressed and incremented by the Control Unit CU via line 3 and Instruction Addressing Unit IAU to read out the instruction words in time sequence.

The information in the operation field Do of the instruction word is routed via line 4 to the Control Unit CU, and the information in the association field Da and in the masking field Dm of the instruction word is routed via lines 5 and 6 to a Comparator Unit CO. Comparator Unit CO compares the latter information (representing the unmasked association-field bits of the instruction word described above) with the assigned flag criteria as supplied it via input 8 from the Flag Comparison Registers FCR, and if a match is found, this is indicated by a coincidence signal >< on output line 10 of the Comparator CO.

The match or coincidence signal >< on output line 10 is applied to the Control Unit CU and causes the latter to execute the operation of the respective instruction word supplied via its input line 4. If no match signal >< appears on the Comparator output line 10, the Control Unit CU does not execute the operation, but merely increments the Instruction Register IR to the next instruction word address.

When the Control Unit CU is to execute an instruction, this is manifested by an "execute" signal on its output line 12, which signal may be applied to the Arithmetic Logic Unit ALU (if present), and to the Input-Output Unit I/O, depending upon the specific instruction involved. The "execute" instruction signal is also applied via line 14 to a Logic Decoder and Router Unit LDR for setting the assignable flags of the data processor, where this is involved in the instruction. The Logic Decoder and Router Unit LDR decodes such instruction and sets or resets, as the case may be, the respective flags via line 16. The flags may be a number of bistable devices, shown by block FD, such as status flip-flops commonly provided in data processors. The states of the flag devices FD are routed back to the LDR unit via line 18, which unit in turn routes them via line 20 to the Flag Comparison Registers FCR upon executing an ASSIGN instruction.

Thus, following an ASSIGN instruction, the flags assigned for the association are represented by the states of the Flag Comparison Registers FCR. These assigned flags are compared in Comparator CO with the unmasked association-field bits of the instruction word as it is read out from the Instruction Register IR to determine whether the operation designated by the word is to be executed or not, as described above.

Figure 3:
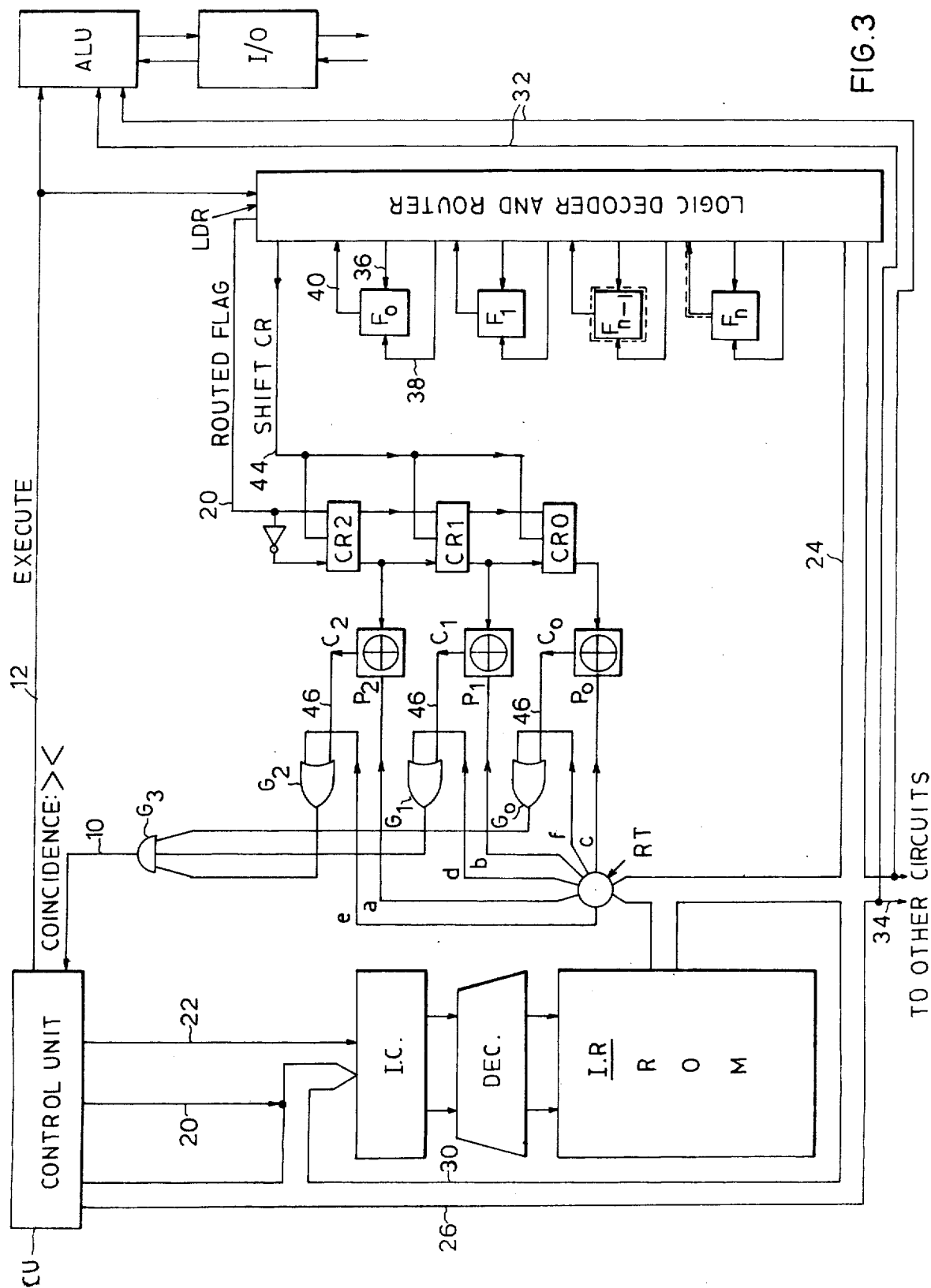
FIG. 3 is a block diagram illustrating one specific form of the processor of FIG. 1.

Specific Example of Apparatus (FIGS. 2 and 3)

FIGS. 2 and 3 illustrate more specifically an example of an apparatus capable of processing by association in accordance with the invention.

With respect first to FIG. 2, there is shown in block diagram form the Instruction Register IR and its addressing unit IAU, the latter including an Instruction Counter IC (e.g., eight-bit) which is addressed and incremented by the Control Unit CU, and a Decoder DEC which decodes the address supplied from the Instruction Counter IC. The Instruction Register IR is preferably a ROM (Read-Only-Memory) capable of storing 256 instruction words.

Each instruction word is of the 13-bit structure described above and is stored in an address of the Instruction Register IR. When addressed by Decoder DEC, the 13-bit instruction word is read out of the 13 ROM microfield output lines $a-n$. The two words of a two-word instruction (FIG. 1b) are stored in succeeding addresses and are read out by first addressing the first address, incrementing the Decoder DEC by one unit, and then addressing the next address.

FIG. 3 illustrates a specific form of the overall apparatus, the parts in FIG. 3 which are common to FIGS. 1 and 2 being correspondingly numbered.

Thus, in FIG. 3 there is shown the Control Unit CU which is connected to the Input-Output Unit I/O via an Arithmetic Logic Unit ALU, the invention also being useful where no ALU unit is included as mentioned above. The Control Unit CU addresses the Instruction Register IR via Instruction Counter IC and Decoder DEC. For example, the Control Unit CU can force a specified address into the Instruction Counter IC via line 20, and can increment the Instruction Counter IC via line 22.

The instruction stored in the Instruction Register IR addressed by the Control Unit CU is read out to a Router RT which routes the various bits of the instruction word to different portions of the data processing system.

The association-field bits $a-c$ (corresponding to association-field information Da in FIG. 1) are routed to three comparators $C_0$, $C_1$, $C_2$. The masking-field bits $d-f$ (corresponding to the masking-field information Dm of FIG. 1) are each routed to one input of one of three OR-gates $G_0$, $G_1$, $G_2$ the second input of each gate being connected to the output of the respective comparator $C_0$, $C_1$, and $C_2$. The latter comparators and OR-gates correspond to the Comparator box CO in FIG. 1.

The operation-field bits $g-n$ (corresponding to the operation-field information Do in FIG. 1) are supplied to the Logic Decoder and Router Unit LDR via line 24 for decoding the instruction and for executing same if a match occurs with the assigned flag criteria as briefly described above. The decision to execute is made by the Control Unit CU which receives the coincidence or match signal $><$ from the comparators, and also the instruction word from the Instruction Register IR via line 10. The decision whether or not to execute the operation specified in the instruction is represented by a signal on its "Execute" line 12.

The Control Unit CU itself interprets and executes many instructions. The read-out instruction may also be supplied via line 30 to the Instruction Counter, IC, for example in a branch operation where the read-out instruction gives the address pertaining to the branch operation. An instruction for fixing the state of an assignable flag, which flags determine the association specified by the instruction word, is supplied to and executed by the Logic Decoder and Router Unit LDR. An ALU unit, or other units if included, would also be supplied (e.g., via line 32, 34) with the instruction words, it being appreciated that their execution, as well as the execution of all other instruction words, depends on the presence of an "Execute" signal on CU output line 12.

The assignable flags may be represented by the status of bistable devices or flip-flops in the data processor. In the preferred example described herein there are only three assignable flags, but the data processor has a much larger number of status flip-flops (e.g., 16) any of which can be selected as one of the three assignable flags. In FIG. 3, the assignable flags are represented by boxes $F_0$, $F_1$, $F_{n-1}$, and $F_n$.

Each flag may be "set" (e.g., via line 36 to flag $F_o$), and "reset" (e.g., via line 38 to flag $F_o$) by the Logic Decoder and Router Unit LDR. The states of the flags may then be routed back to the LDR unit (e.g., via line 40 from flag $F_o$) upon command ("Assign") from an instruction word, which states are routed via line 20 to the respective Flag Comparison Registers $CR_0$ $CR_1$ $CR_2$. The latter registers correspond to box FCR in FIG. 1, there being one such register for each of the assignable flags, or a total of three in the described example. Line 44 from the LDR unit is used for shifting the Flag Comparison Registers $CR_0$ – $CR_2$ so that the final condition of these registers corresponds to the condition of flags $F_0$, $F_1$, $F_n$. The comparators $C_o$ – $C_2$ compare the association-field bits $a-c$ with the states of the Flag Comparison Registers $CR_o$ – $CR_2$, and in each case where a match occurs, a 1 is produced on the output line 46 of the respective comparator. The latter outputs are fed to the respective OR-gates $G_o$ – $G_2$, the latter gates also being fed, at their second inputs, with the masking-field bits $d-f$ of the instruction word. Thus, in any masking-field bit position where a 1 occurs, its respective OR-gate $G_o$ – $G_2$ will produce a 1 output irrespective of whether the corresponding comparator $C_o$ – $C_2$ found a match between the association-field bit and the assigned flag. In other words, a 1 in the masking field overrides or masks the respective association-field bit and causes the processor to ignore it; whereas a 0 in the masking field unmasks the respective association-field bit and causes the data processor to honor it.

The outputs of all the OR-gates $G_o - G_2$ are fed to a three-input AND-gate $G_3$ so that a coincidence signal words are used in the specific example described below.

TABLE 4

| Word | a b c d e f | g | h | j | k | l | m | n | Operation | |
|------|-------------|---|---|---|---|---|---|---|-----------|---|
| 1 | | 0 | 0 | 0 | 0 | 1 | 0 | 0 | if γ (a,b,c) φ (d,e,f) | Set A |
| 2 | | 0 | 0 | 1 | 0 | 1 | 0 | 0 | ,, | Set B |
| 3 | | 0 | 1 | 0 | 0 | 1 | 0 | 0 | ,, | Set C |
| 4 | | 0 | 1 | 1 | 0 | 1 | 0 | 0 | ,, | Set D |
| 5 | | 1 | 0 | 0 | 0 | 1 | 0 | 0 | ,, | Set E |
| 6 | | 0 | 0 | 0 | 0 | 0 | 0 | 0 | ,, | Reset A |
| 7 | | 0 | 0 | 1 | 0 | 0 | 0 | 0 | ,, | Reset B |
| 8 | | 0 | 1 | 0 | 0 | 0 | 0 | 0 | ,, | Reset C |
| 9 | | 0 | 1 | 1 | 0 | 0 | 0 | 0 | ,, | Reset D |
| 10 | | 1 | 0 | 0 | 0 | 0 | 0 | 0 | ,, | Reset E |
| 11 | | 0 | 0 | 0 | 0 | 0 | 1 | 0 | ,, | RI |
| 12 | | 0 | 0 | 1 | 0 | 0 | 1 | 0 | ,, | DIV |
| 13 | | 0 | 1 | 0 | 0 | 0 | 1 | 0 | ,, | AD/SUB |
| 14 | | 0 | 1 | 1 | 0 | 0 | 1 | 0 | ,, | ADRO |
| 15 | | 1 | 0 | 0 | 0 | 0 | 1 | 0 | ,, | LEFA |
| 16 | | 1 | 0 | 1 | 0 | 0 | 1 | 0 | ,, | ARDI |
| 17 | | 1 | 1 | 0 | 0 | 0 | 1 | 0 | ,, | MPY |
| 18 | | 1 | 1 | 1 | 0 | 0 | 1 | 0 | ,, | LI |
| 19 | | 0 | 0 | 0 | 1 | 0 | 1 | 0 | ,, | DIS |
| 20 | | 0 | 1 | 1 | 0 | 0 | 0 | 1 | ,, | EX $R_1 R_2$ |
| 21 | | 1 | 0 | 0 | 0 | 0 | 0 | 1 | ,, | EX $R_2 R_3$ |
| 22 | | 0 | 0 | 0 | 0 | 1 | 0 | 1 | ,, | $R_1 \leftarrow 0$ |
| 23 | | 0 | 0 | 1 | 0 | 1 | 0 | 1 | ,, | $R_2 \leftarrow 0$ |
| 24) 25) | | 1 | 0 | 0 | 1 | 1 | 1 | 1 | ,, | JUMP (Defines JUMP Address |

>< is produced on its output line 10 only if a 1 has been inputted from all three OR-gates, i.e., only if a match has occurred between the unmasked association-field bits and the assigned flag criteria, The coincidence signal >< on line 10 corresponds to the signal on the same line 10 in FIG. 1, and causes the Control Unit CU to produce an "Execute" signal on line 12 to enable the respective unit of the data processor (e.g., the LDR or the ALU units) to execute the operation designated in the operation field (bits $g-n$) of the respective instruction word.

It will thus be seen that the Control Unit CU will produce an "Execute" signal to enable the execution of the operation designated in the respective instruction word only if there is a match between the assigned flag criteria and the unmasked association bits in the respective instruction word, or if all the association-field bits have been masked thereby making the execution of the instruction unconditional.

In this connection, it may be mentioned that the "Assign" instruction, wherein the flags are assigned by transferring the status of selected flip-flops $F_o - F_n$ to the Flag Comparison Registers $CR_o - CR_2$, are always unconditional instructions. This will be more apparent from the description below of an operational example.

FIG. 3a illustrates in block diagram form the main elements of the Logic Decoder and Router block LDR of FIG. 3.

Operational Example

In order to aid in better understanding the invention, a simple operational example will now be described illustrating the operation of the data processor of FIG. 3, reference also being made to the state diagram of FIG. 4. The operation involved in this example is the multiplication of the number 2 by the number 3 to compute and display the product 6.

Table 4 below sets forth in coded form a number of illustrative instruction words that can be used in programming the processor, some of which instruction The significance of the various bit positions set forth in Table 4 are described above, it being recalled that bits $a-c$ constitute the association field of the instruction word, bits $d-f$ constitute the masking field, and bits $g-n$ constitute the operation field designating the operation or command to be performed if the conditions set forth by the unmasked association-field bits are met by the assigned flag criteria.

With respect to the first 10 instruction words in the above Table 4, A-E refer to the status flip-flops in the processor which can be used as the flags in the association. Only five such flip-flops are set forth in Table 4, of which only three can be assigned as flags at any one time. As noted above, however, the processor could include a much larger number of status flip-flops, 16 such flip-flops having been found practical for many applications.

The first 10 instruction words in Table 4 thus specify that if the association-field bits $a-c$ which are unmasked by the masking-field bits $d-f$ are matched by the assigned flags, then "set" (first five words) or "reset" (next five words) the designated flip-flop.

The last 14 words set forth further conditional operations to be performed if the specified association is met. The meanings of the symbols used in the operation portion (bits $g-n$) of the last 14 instruction words in Table 4 above are set forth in the following Table 5:

TABLE 5

| | |
|---|---|
| RI | Read-In from Keyboard into Arith. Reg. $R_1$ |
| DIV | Divide |
| AD/SUB | Add/Subtract |
| ADRO | Align. of Decimal Setting and Point-Off |
| LEFA | Left Align. |
| ARDI | Arrange (Format) Word for Display |
| MPY | Multiply |
| LI | Lock-In (to talk to an external ROM) |
| DIS | Display |
| EX $R_1 R_2$ | Transfer Contents Reg. $R_1$ to Reg. $R_2$ |
| EX $R_2 R_3$ | Transfer Contents Reg. $R_2$ to Reg. $R_3$ |
| $R_1$ O | Reset Register $R_1$ |
| $R_2$ O | Reset Register $R_2$ |
| JUMP | Branch Instruction Counter to Address Defined in |

TABLE 5-continued

Next Instruction Word

Thus, Instruction Word 11, containing the symbol RI in the operation field (bits g–n) in Table 4 above, means that if the unmasked association bits are matched by the flag criteria, then execute a read-in from the keyboard into Arithmetic Register $R_1$. The last instruction word appearing in Table 4 means that if the conditions set forth in the association and masking fields are met, then execute a "Branch" or "Jump" of the Instruction Counter IC to the address defined in the next succeeding instruction word.

As indicated earlier, all "Assign" instructions are unconditional. That is to say, whenever the states of selected flip-flips $F_o - F_n$ are to be transferred to the Flag Comparison Registers $CR_o - CR_2$ (FIG. 3), to be used as the assigned flag criteria, this is done unconditionally; accordingly, the "Unconditional Assign" instruction need not specify any conditions in the association and masking fields. The association and masking fields may therefore be used for specifying the status flip-flops $F_o - F_n$ (FIG. 3) to be assigned as the flag criteria by transferring their states to the Flag Comparison Registers $CR_o - CR_2$.

In our example, an "Unconditional Assign" instruction is designated by bits 1, m, n, being 1, 1 and 0, respectively, thereby leaving bits a-k available for designating the specific flip-flops ($F_o - F_n$) to be assigned as the flag criteria. For designating the latter, a 0 in bit position b designates status flip-flop A, a 0 in bit position c designates status flip-flop B, and a 0 in bit position f designates status flip-flop C. Thus, the instruction word

TABLE 6

| a | b | c | d | e | f | g | h | j | k | l | m | n |
|---|---|---|---|---|---|---|---|---|---|---|---|---|
| 1 | 0 | 0 | 1 | 1 | 0 | 1 | 1 | 1 | 1 | 1 | 1 | 0 | constitutes an "Unconditional Assign" instruction commanding the states of flip-flops A, B and C to be unconditionally assigned to the Flag Comparison Registers $CR_o - CR_2$, to be used as the assigned flag criteria.

In the operation involved in our simple example to be described below, namely the multiplication of the number 3 by the number 2 to produce and display the product 6, three manipulative steps are involved, namely:

1. depress the 2 digit key, at which time the digit 2 should be displayed and stored; then
2. depress the 3 digit key, at which time the digit 3 should be displayed and stored; and finally
3. depress the "multiply" key, at which time the product 6 should be displayed and stored.

In this example, flip-flops A, B and C are the status flip-flops $F_o$, $F_1$, $F_n$ used as the assignable flags by transferring their states to the Flag Comparison Registers $CR_o - CR_2$.

As shown in the State Diagram of FIG. 4, the data processor, starting from the Fetch State (FS), first fetches the instruction from the Instruction Register IR and compares the required conditions as specified in the association and masking fields $[\gamma\,(a, b, c)\,\phi\,(d, e, f)]$ of the instruction word with the assigned flag criteria $$\sum_{z=0}^{z=2} CR_z.$$

If no match is found ($\overline{><}$), the Instruction Counter IC is incremented and the next instruction is fetched. If a match is found ($><$), the processor proceeds to the Execute State (E) to execute the instruction. When the execution of the instruction is completed (EE), the processor returns to the Fetch State, but if it is not completed ($\overline{EE}$), the processor remains in the Execute State.

Table 7 below illustrates a program of instruction words that can be stored in the Instruction Register IR (FIG. 3) of the data processor to perform the above simple multiplication operation:

TABLE 7

| IC | a b c | d e f | g h j k l m n | Operation |
|---|---|---|---|---|
| 00 | φ φ φ | 1 1 1 | 1 0 1 0 0 1 0 | Unconditional ARDI |
| 01 | φ φ φ | 1 1 1 | 0 0 0 1 0 1 0 | Unconditional DIS |
| 02 | φ φ φ | 1 1 1 | 0 0 0 0 0 1 0 | Unconditional RI |
| 03 | φ φ φ | 1 1 1 | 0 0 0 0 1 0 0 | Unconditional SET A |
| 04 | φ φ φ | 1 1 1 | 1 0 1 0 0 1 0 | Unconditional ARDI |
| 05 | φ φ φ | 1 1 1 | 0 0 0 1 0 1 0 | Unconditional DIS |
| 06 | 1 0 0 | 1 1 0 | 1 1 1 1 1 1 0 | Assign ABC |
| 07 | φ φ 1 | 1 1 0 | 0 1 1 0 0 0 1 | If A EX $R_1 R_2$ |
| 08 | φ φ 1 | 1 1 0 | 0 0 0 0 0 1 0 | If A RI |
| 09 | φ φ 1 | 1 1 0 | 1 0 1 0 0 1 0 | If A ARDI |
| 10 | φ φ 1 | 1 1 0 | 0 0 0 1 0 1 0 | If A DIS |
| 11 | φ φ 1 | 1 1 0 | 1 1 0 0 0 1 0 | If A MPY |
| 12 | φ φ 1 | 1 1 0 | 0 0 1 0 1 0 0 | If A SER B |
| 13 | 1 0 0 | 1 1 0 | 1 1 1 1 1 1 0 | Assign ABC |
| 14 | φ 1 1 | 1 0 0 | 0 1 1 0 0 0 1 | If AB EX $R_1 R_2$ |
| 15 | φ 1 1 | 1 0 0 | 1 0 1 0 0 1 0 | If AB ARDI |
| 16 | φ 1 1 | 1 0 0 | 0 0 0 1 0 1 0 | If AB DIS |
| 17 | φ 1 1 | 1 0 0 | 1 0 0 1 1 1 1 | IF AB JUMP TO |
| 18 | 0 0 0 | 1 0 0 | 0 0 0 0 0 0 0 | IC = 16 |

When power is "on", all the Arithmetic Registers (e.g. $R_1$, $R_2$, not illustrated) and the status flip-flops $F_o - F_n$ (FIG. 3) are in their "reset" or 0 condition, and the Instruction Counter IC is at address 00.

From Table 7, it will be seen that address 00 is an unconditional instruction since all the association-field bits a-c are masked by a 1 in the masking-field bits d-f. Accordingly, the processor will produce a coincidence signal ($><$) inputted to the Control Unit CU (via line 10, FIG. 3), causing the latter to produce an "Execute" signal on its output line 12, commanding execution of the designated instruction. The operation or command designated in the operation field g–n of the instruction is ARDI, so that (from Table 5 above) there will be executed the command to Arrange (Format) the Word for Display, and the Instruction Counter IC will be incremented to address 01.

From Table 7, it will be seen that address 01 also specifies an unconditional instruction (the association-field bits all being masked by the masking-field bits), so that the command designated, namely to Display (Table 5), will be executed. Since all the registers were originally reset to 0, there will be displayed a 0.

A Display Instruction must always be followed by the depression of a keyboard key before the "End-of-Execute" (EE, FIG. 4) is generated to return the processor to the Fetch State, to fetch the next instruction. Thus the processor will "hold" at the address of the Display Instruction (in this case, address 01) until a key is depressed.

Accordingly, when digit key 2 is depressed, the Instruction Counter will be incremented to address 02.

Address 02 specifies an unconditional Read-In from the Keyboard into the Arithmetic Register $R_1$ (Tables 4 and 5). An unconditional Read-In of address 02 is thus executed, and the processor reads the value of the depressed digit 2 key into the Arithmetic Register ($R_1$). The processor then returns to the Fetch State to fetch the next instruction, namely that at address 03.

Address 03 specifies an unconditional "Set A" (Table 4), and therefore the status Flip-Flop (e.g. $F_o$) used as A will be "set". Following the execution of this instruction, the Instruction Counter IC is now at address 04.

Address 04 is an unconditional ARDI, calling on the processor to unconditionally arrange the word stored in the Arithmetic Register ($R_1$) for display. The Instruction Counter is incremented to address 05, in which the instruction is an Unconditional Display, calling on the processor to display the number (the digit 2) stored in the Arithmetic Register ($R_1$). Thus, the digit 2 of the depressed key is displayed.

As in the case of the Display Instruction at address 01, the process will "hold" at the address of the Display Instruction, and will not proceed to the next instruction until another key is depressed. Thus, the processor will "hold" at address 05 until the 3 digit key is depressed, at which time the Instruction Counter IC is incremented to address 06.

The instruction at address 06 is an "Unconditional Assign", calling on the processor to transfer to the Flag Comparison Registers $CR_o - CR_2$ the states of the status Flip-Flops used as A, B and C (See Table 6 above). Since only Flip-Flop A has been set (by the instruction of address 03 above), the condition of the Flag Comparison Registers $CR_o$–$CR_2$ will be: $CR_o=1$, $CR_1=0$ and $CR_2=0$.

The instruction at address 07 is conditional, and is to be executed only if the unmasked association-field bit $c$ (which is 1) matches the condition of the Flag Comparison Registers $CR_o$–$CR_2$. In this case, a coincidence is found, and therefore a >< signal will be produced on line 10 (FIG. 3) permitting the processor to execute the command of the instruction word. Accordingly, the instruction at address 07, which is to transfer the contents of Arithmetic Register $R_1$ to Arithmetic Register $R_2$, will be executed, and the Instruction Counter IC will be incremented to address 08.

The instruction at address 08 is also a conditional one, the condition being the same as at address 07 and also being met by the states of the Flag Comparison Registers $CR_o$–$CR_2$ as the instruction of address 07. The instruction of address 08, namely to Read-In the value of the Depressed Key (3) is thus executed, and the Instruction Counter IC is incremented to address 09.

The instructions of addresses 09–11 are similarly conditional, and the conditions are similarly met. Accordingly, each instruction will be executed in its turn, so that the processor will Arrange the Word for Display (address 09), then Display (address 10), and then Multiply (assuming the "multiply" key has been depressed) the values in Registers $R_1$ and $R_2$ and store the product in $R_2$, all as apparent from Tables 4 and 5.

The instruction at address 12 is similarly conditional and the condition is similarly met, this instruction calling for setting status Flip-Flop B (Table 5).

The next instruction, address 13, is an "Unconditional Assign" (Table 6), calling for the processor to transfer the states of the three Flip-Flops A, B and C to the Flag Comparison Registers $CR_o$–$CR_2$ as in instruction 06, so that now the states of the Flag Comparison Registers are: $CR_o=1$, $CR_1=1$ and $CR_2=0$.

In the next instruction (address 14), the association-field bits $b$ and $c$ are both unmasked and both equal 1, specifying the condition that $CR_o = 1$, and $CR_1 = 1$. Since this condition is met, a coincidence signal (><) is produced on line 10 (FIG. 3) to the Control Unit CU, and the instruction of address 14 is executed. Thus, the contents of Register $R_2$ are transferred to Register $R_1$, so that the product is now in Register $R_1$.

The instructions of addresses 15 and 16 are similarly conditional, and the conditions are similarly met; therefore, both will be executed, so that the product in Register $R_1$ is Arranged for Display (address 15) and is then Displayed (address 16).

Should the digit key 2 still be depressed at this time, the Instruction Counter IC will be incremented to address 17. This is a similarly conditional instruction, which condition is met, but the command called for is to branch the Instruction Counter to the address whose value is defined in the next address, i.e. address 18. The word in address 18 is not an instruction word, but rather the branch address, and in this case it defines address 16, so that the Instruction Counter is returned back to address 16, whereupon the processor stays in display.

APPLICATION OF BASIC ASSOCIATIVE PROCESSING TECHNIQUE FOR CONTROLLING EXTENSION UNITS

General

As indicated earlier, the basic associative-processing technique can be used in a system including a master data processor controlling one or more extension data processing units. One application of such a system is for accommodating, without memory modification, a future extension unit as and when required by the user, or as and when made available by the manufacturer. Another application is in a multi-processing system, wherein the master data processor can activate extension units in accordance with the internal memory of the master processor, while either retaining control, or transferring control to the respective extension unit.

The foregoing features of the invention can be obtained by modifying the master data processor, as to be described below, and by including Poll and Select Instructions in the internal memory of the master data processor. The same word structure as described above can be used for both the Poll and Select Instructions, namely one including an association field, a masking field, and an operation field, the Poll and Select Instructions being designated in the operation field. Both the Poll Instruction and the Select Instruction would include two instruction words stored in immediately succeeding addresses in the internal memory. The Select Instruction, however, could be one of two types, namely one designating a "Select and Keep Control" instruction, wherein the master data processor activates the selected extension unit but keeps control; or a second type designating a "Select and Transfer Control" instruction, wherein the master activates the selected extension unit and transfers control.

The foregoing types of instruction words and the data processing system in which they are used are described below in more detail particularly with respect to a specific example of a system operating in accordance with such instructions.

The Poll and Select Instructions

The Poll Instruction, as indicated above, polls or interrogates a specified extension unit to determine whether or not it is connected in the system, and also whether it is available for data processing.

The Poll Instruction comprises two 13-bit words stored in the Instruction Register of the master data processing system in successive addresses. In the system described, the two words, ($n$) and ($n+1$), comprising a Poll Instruction define the following:

TABLE 8

| Word | Poll Instruction a b c d e f g h j k l m n | Defines |
|---|---|---|
| n | (condition) 0 0 0 1 1 1 1 | Conditional Poll Command |
| n+1 | (condition) (address) | Conditional Address of Polled Unit |

The various fields of the first word ($n$) of the Poll Instruction are the same as in the other 13-bit instruction words described above, except that the operation field defines the Poll Command. Thus, the three bit positions $a$–$c$ of the first word ($n$) constitute the association field and may be used to designate up to three flag criteria to be matched by previously assigned flags as a condition for the execution of the Poll Command. The next three bits $d$–$f$ constitute the masking field and tell the processor to ignore one or more of the association-field bits; a 1 in each of the masking-field bit positions $d$–$f$ would cause the processor to ignore (i.e. to mask) all the association-field bits $a$–$c$, thereby making the instruction an unconditional one. The remaining seven bit positions $g$–$n$ constitute the operation field of the instruction word. The example illustrated in Table 8 requires a 0 in each of bit positions $g$–$j$ and a 1 in each of bit positions $k$–$n$, for designating the Poll Command.

The second word ($n+1$) of the Poll Instruction also includes 13 bits. As in the first word ($n$), bits $a$–$c$ constitute the association field, and bits $d$–$f$ constitute the masking field, both fields specifying the conditions under which the Poll Operation is to be executed. The remaining seven bits ($g$–$n$) are therefore available for specifying the address of the extension units to be polled, these seven bits permitting up to 128 extension units to be designated.

As indicated earlier, the invention is not only useful with respect to systems including existing extension units, but also with respect to systems designed to accommodate future extension units. Accordingly, when the master data processor issues a Poll Instruction, it must be informed (1) whether the polled or specified extension unit is actually connected in the system, and also (2) whether it is available for data processing.

The foregoing two possible situations with respect to the polled extension unit constitute two conditions which may be assigned as flag criteria for the execution of the subsequent Select Instruction, at which time the data processor activates the selected extension unit. A third condition assigned as a flag criterion for executing the Select Instruction may be specified in the association-field and masking-field bits of the Poll Instruction itself.

Thus, the conditions determining whether or not a Select Instruction will be executed following a Poll Instruction are as follow:

a. a coincidence (represented by the symbol $><$) between the previously assigned flag criteria and the unmasked association-field bits of the Poll Instruction;

b. the connection (represented by the symbol ACK of the polled extension unit in the data processing system; and c. the availability (represented by the symbol NAK) of the polled extension unit for a data processing task.

The foregoing conditions which are used as the assigned flag criteria for the conditional execution of a Select Instruction, may be represented in Boolian terms according to the following Table 9:

TABLE 9

| a $CR_2$ $<>$ | b $CR_1$ ACK | c $CR_0$ NAK | |
|---|---|---|---|
| 0 | 0 | 0 | Poll condition false; Polled E.U. non-connected |
| 0 | 0 | 1 | Poll condition false; Polled E.U. connected, unavailable |
| 0 | 1 | 0 | Poll condition false; Polled E.U. non-connected |
| 0 | 1 | 1 | Poll condition false; Polled E.U. connected, available |
| 1 | 0 | 0 | Poll condition true; Polled E.U. non-connected |
| 1 | 0 | 1 | Poll condition true; Polled E.U. connected, unavailable |
| 1 | 1 | 0 | Poll condition true; Polled E.U. not-connected, available |
| 1 | 1 | 1 | Poll condition true; Polled E.U. connected, available |

In the above Table 9, the conventions are used that: (a) $><$ = 1 if there is a match between the unmasked association-field bits of the Poll Instruction and the previously assigned flag criteria; (b) ACK = 1 if the polled extension unit is available for data processing; and (c) NAK = 1 if the polled extension unit is connected.

As a result of executing the Poll Instruction, the foregoing conditions are registered in the Flag Comparison Register (FCR, FIGS. 1 and 5) of the master data processor, and are used as the assigned flag criteria which are compared with the unmasked association-field bits of the subsequent Select Instruction to determine whether or not that instruction will be executed.

Table 9 above designates, for each of the three foregoing conditions, the respective Comparison Registers ($CR_0$, $CR_1$, $CR_2$) of the master processor (FIGS. 2 and 6) in which each condition may be registered as the flag criteria, and also designates the respective unmasked association-field bits ($a$–$c$) of the Select Instruction word which are compared with the foregoing assigned flag criteria to determine whether or not the Select Instruction will be executed.

The Select Instruction is used to activate the selected extension unit provided the conditions specified in the Select Instruction are met. The Select Instruction also comprises two 13-bit words defining the following:

TABLE 10

| | Select Instruction | |
|---|---|---|
| Word | a b c d e f g h j k l m n | Defines |
| z | (condition) 0 1 0 1 1 1 1 | Conditional Select Command |
| z+1 | a-h = IC address | Selected E.U. address |
| | j-n = EU address | and I.C. address |

The first word ($z$) of the Select Instructon includes three association-field bits ($a$–$c$) designating the conditions for the execution of the Select Instruction, masking-field bits ($d$–$f$) which may be used to mask one or more of the association-field bits, and operation-field bits ($g$–$n$) designating the Select Operation. Actually, the latter operation field can be used for designating two types of Select Operations, one being a Select and Keep Control Operation wherein the master data processor activates the extension unit but keeps control; and the other designating a Select and Transfer Control Operation wherein the master activates the extension unit and also transfers control to it. The first word ($z$) of Table 10 above designates the latter type, but illustrations of both types are included in the operational example described below.

The second word ($z+1$) of the Select Instruction also includes 13 bits, but these are divided into two fields as shown in Table 10, one field (bits $j$–$n$) defining the extension unit (EU) to be selected for activation, and the other field ($a$–$h$) defining the Instruction Counter (IC) address of the extension unit to be activated.

It will thus be seen that when the unmasked association-field bits ($a$–$c$) of the first word ($z$) of the Select Instruction are matched by the flag criteria assigned (per Table 9) following a Poll Instruction, a Select Operation will be executed. The latter may be either a Select and Keep Control, or a Select and Transfer Control, as determined by the operation-field bits ($g$–$n$) of the first word ($z$) of the Select Instruction. The extension unit (EU) and its instruction counter (IC) address to be activated will be as designated in the second word ($z+1$) of the Select Instruction.

Data Processing System Using Poll and Select Instructions

Figure 5:
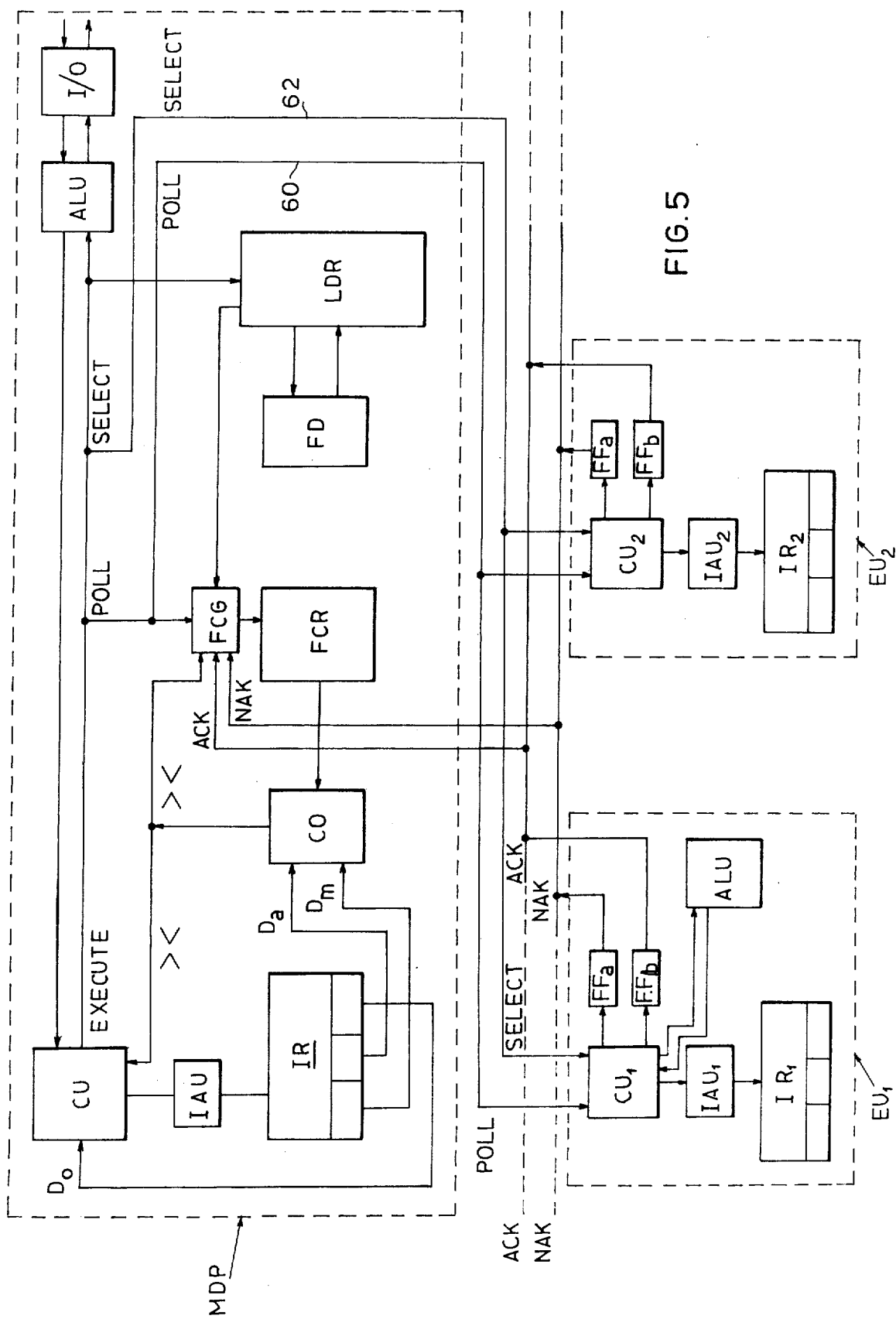
FIG. 5 is a block diagram of a data processing system including a master data processor and a plurality of extension data processing units, this system illustrating the application of the basic associative processing technique for controlling the extension units by means of Poll and Select Instructions.
Figure 6:
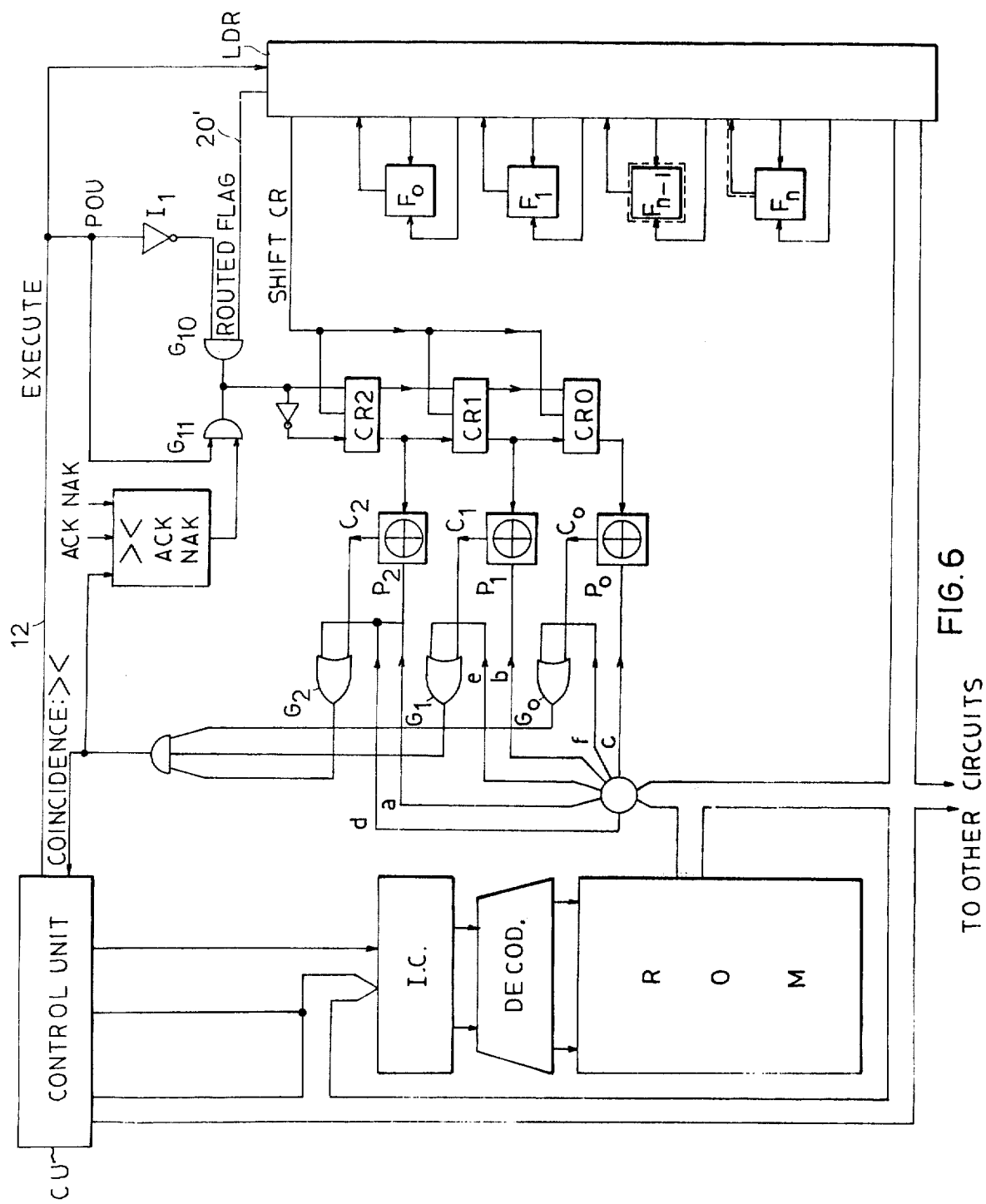
FIG. 6 is a block diagram illustrating more specifically the master data processor in the system of FIG. 5.

An example of a data processing system using the above-described Poll and Select Instructions is illustrated in FIGS. 5 and 6. FIG. 5 shows the general layout of the overall data processing system including a Master Data Processor MDP and a plurality of Extension Units EU, and FIG. 6 is a block diagram similar to that of FIG. 3 but showing the modifications to be included in the Master Data Processor for use in the system of FIG. 5.

With reference first to FIG. 5, there is shown a Master Data Processor MDP controlling a plurality of Extension Units $EU_1$ and $EU_2$. While only two such units have been illustrated, there could of course be a much larger number. As indicated earlier, the Extension Units included in this system could be existing units, or they could be future units to be accommodated in the system as and when required by the user, or as and when made available by the manufacturer. It will be appreciated that an existing system will be able to accommodate and talk to a future extension unit only if at the time of the design of the existing system, particularly of programming the internal memory (e.g. a ROM) of the master data processor, the appropriate Poll and Select Instructions are inserted designating the as yet non-existing units, so that at the time such units do come into existence and are connected into the system, they can be addressed by the master data processor.

The Master Data Processor MDP illustrated in FIGS. 5 and 6 is of the same basic design as described above with reference to FIGS. 1 and 3, and therefore the same reference characters have been used to identify corresponding parts. Thus, the Master Data Processor includes a Control Unit CU which receives data from the Input-Output Unit I/O via an Arithmetic Logic Unit ALU, the latter unit not being essential as indicated above. The program is stored in the form of a series of instruction words in the Instruction Register IR which is addressed and incremented by the Control Unit CU via the Instruction Addressing Unit IAU to read out the instruction words in time sequence.

The instructon words stored in the Instruction Register IR are of the same basic 13-bit structure described with reference to FIGS. 1–4, except that the Poll and Select Instructions each include two instruction words as more particularly described above.

As also described above, the information in the operation field $D_o$ of the instruction word is routed to the control unit CU, and the information in the assocation field $D_a$ and in the masking field $D_m$ of the instruction word is routed to a Comparator Unit CO. The latter unit compares the information in the association and masking fields with the assigned flag criteria as supplied it from the Flag Comparison Register FCR, and if a match is found, this is indicated by a coincidence signal >< outputted from the Comparator CO to the Control Unit CU. The latter signal enables the Control Unit to execute the instruction.

The operation of the Master Data Processor MDP is as generally described above with reference to FIGS. 1–4 for the various types of instructions stored and read out from its Instruction Register IR. However, when the instruction is either a Poll Instruction or a Select Instruction, the operation is somewhat different, and the description below concerns mostly these differences involved with respect to Poll and Select Instructions.

The extension units $EU_1$, $EU_2$ —, may be of the type including a Control Unit ($CU_1$, $CU_2$), an Instruction Register $IR_1$, $IR_2$, and some or all of the other units (not illustrated) included in the Master Processor MDP, as well as an Arithmetic Logic Unit shown (as $ALU_1$) only with respect to $EU_1$. In the example illustrated, the Control Units of all the Extensions EU are connected to receive the Poll and Select Instructions from the Master Data Processor MDP, this being schematically illustrated in FIG. 5 by "Poll" line 60 and "Select" line 62 from the Control Unit CU of the Master MDP to the Control Units of the Extensions. The Control Unit of each Extension addresses the Instruction Register of the respective Extension to read out the instructions stored therein. Normally, the Extension Control Units ($CU_1$, $CU_2$) would read out the instructions from the respective Instruction Registers in time sequence, but they may also be controlled to read out any specified address (IC) of the respective Instruction Register.

The Control Unit ($CU_1$, $CU_2$) of each Extension also controls a first flip-flop $FF_a$ to indicate whether or not the Extension Unit is connected in the system, and a second flip-flop $FF_b$ to indicate whether or not the Extension Unit is available for data processing. The foregoing flip-flops thus correspond to flip-flops $F_o - F_n$ in the system described with reference to FIG. 3, and are used as two of the flag criteria assigned per Table 9 above to the Flag Comparison Register FCR of the Master Processor MDP following a Poll Operation to determine whether or not the Select Operation will be executed.

When a Poll Instruction is executed, by finding a match between its unmasked association-field bits and the previously assigned flag criteria in the same manner as the other operations described above with reference to FIGS. 1–4, a "Poll" signal is supplied via line 60 to the Control Unit of the Extension specified in the Poll Instruction. This causes the polled Extension Unit to respond by reading out the status of its flip-flops $FF_a$ and $FF_b$. Flip-flop $FF_a$ is connected to the NAK line and indicates (e.g. by a 1 level) that it is connected in the system (per Table 9 above), and flip-flop $FF_b$ is connected to the ACK line and indicates (e.g. by a 1 level) that it is available for data processing.

During a Poll Operation, the foregoing NAK and ACK signals, instead of the previously described signals from the Flag Bistable Devices FBD, are supplied to the Flag Comparison Register FCR of the Master Data Processor MDP. For this purpose, FIG. 5 illustrates a Flag Comparison Gate FCG which is controlled by the "Poll" signal from the Control Unit CU of the Master Data Processor MDP to input the above NAK and ACK signals into the Flag Comparison Register FCR when the Poll Instruction is executed. Thus, during the execution of a Poll Instruction, the connection and availability of the addressed Extension Unit are assigned as flag criteria in the Flag Comparison Register FCR, instead of the other flag criteria of the devices FBD. At the same time, whether or not the conditions of the Polling Instruction have been met is also assigned as a flag criterion in the Flag Comparison Register FCR, this being effected by conveying the coincidence signal $><$ (produced when the polling conditions are met) also into the Flag Comparison Register FCR via gate FCG during a Poll Operation.

Thus, the three conditions tabulated in Table 9 above are registered in the Flag Comparison Register FCR as the assigned flag criteria for determining whether or not the subsequent Select Instruction will be executed.

FIG. 6 illustrates more particularly the block diagram of the Master Data Processor MDP included in the system of FIG. 5. The Master Data Processor MDP is of substantially the same arrangement as illustrated in FIG. 3, and therefore common parts have been correspondingly numbered, the main differences in FIG. 6 relating to the arrangement for assigning the flag criteria to the Flag Comparison Register FCR during a Poll Operation, namely to the three registers $CR_o$, $CR_1$ and $CR_2$ used for retaining the assigned flag criteria to be compared in Comparator CO with the unmasked association-field bits of the instruction word.

Thus, when a Poll Operation is executed, a "Poll" signal is applied via inverter $I_1$ to gate $G_{10}$ to block line 20 (corresponding to line 20, FIG. 3) from conditioning the Flag Registers $CR_o$, $CR_1$, $CR_2$ by the Logic Decoder and Router unit LDR. The Flag Registers $CR_o$, $CR_1$, $CR_2$ are instead conditioned via gate $G_{11}$, enabled by the "Poll" signal, to assign to these registers the previously described flags of Table 9, namely the coincidence flag $><$ designating whether or not the polling conditions have been met, the NAK flag designating whether or not the polled Extension Unit EU is connected in the system, and the ACK flag designating whether or not the polled Extension Unit is available for data processing.

Now, when the Select Instruction is read out of the Instruction Register IR of the Master Data Processor MDP, the Comparators $C_o$, $C_1$, $C_2$ will compare the unmasked association-field bits of the Select Instruction (word $z$, Table 10 above) with these assigned flag criteria, and if a match occurs it will produce a coincidence signal ($><$) telling the Control Unit CU to execute the Select Instruction. The Control Unit CU will then activate, via the "Select" line, the specified Extension Unit EU at the specified address IC of its Instruction Register as defined in the second word ($z+1$, Table 10), and will cause the Control Unit either to retain control in the Master Processor (Select and Retain Control Operation), or to transfer the control to the Extension Unit (Select and Transfer Control Operation), as specified in the Select Instruction and as described above.

Example of Poll and Select Operations

Table 11 below sets forth in coded form a number of illustrative instruction words that can be included in any desired location in the Instruction Register IR of the master processor MDP to illustrate the Poll and Select Operations described above:

TABLE 11

| IC | a b c d e f g h j k l m n | Operation |
|---|---|---|
| 01 | φ φ φ 1 1 1 0 0 0 0 1 0 0 | Unconditional Set A |
| 02 | φ φ φ 1 1 1 0 0 1 0 1 0 0 | Unconditional Set B |
| 03 | φ φ φ 1 1 1 0 1 0 0 1 0 0 | Unconditional Set C |
| 04 | 1 0 0 1 1 0 1 1 1 1 1 1 0 | ASSIGN A B C |
| 05 | 1 1 1 0 0 0 0 0 1 1 1 1 | Conditional Poll |
| 06 | 1 1 1 0 0 0 0 0 0 1 1 0 | Conditional Address of Polled EU = 10 |
| 07 | 1 1 1 0 0 0 0 1 0 1 1 1 1 | Conditional Select(& Transfer Control) |
| 08 | 0 0 0 1 1 0 0 1 0 1 0 1 0 | Polled EU = 10; IC = 25 |
| 09 | φ φ φ 1 1 1 0 0 0 1 1 1 1 | Unconditional Poll |
| 10 | φ φ φ 1 1 1 0 0 0 1 1 1 1 | Unconditional Address of Polled EU = 15 |
| 11 | 1 1 1 1 0 0 0 1 0 0 1 1 1 1 | Conditional Select (& Keep Control) |
| 12 | 0 0 1 0 0 0 1 1 0 1 1 1 1 | Polled EU = 15; IC = 35 |

From the earlier description with respect to FIGS. 1–4, it will be seen that addresses 01, 02 and 03, respectively, specify an Unconditional Set of the three status flip-flops (e.g. $F_o$, $F_1$, and $F_n$) used as flags A, B and C. Address 04 is an Unconditional Assign calling on the processor to transfer to the Flag Comparison Registers $CR_o$, $CR_1$, $CR_2$ the states of the status flip-flops used as flags A, B, and C. Thus, at the completion of the instruction of address 04, the three flag registers would be set, so that $CR_2 = 1$, $CR_1 = 1$ and $CR_o = 1$.

Addresses 05 and 06 are the two words constituting a Conditional Poll Instruction. As shown in Table 8 above, the association-field bits ($a$–$c$) and the masking-field bits ($d$ $f$) of both words specify the conditions which are to be met before the Poll Instruction is to be executed. It will be seen that these conditions are indeed met in our example since they specify the previously-mentioned states of $CR_o$, $CR_1$ and $CR_2$, and therefore the Poll Operation will be executed. Bits $(g-n)$ of the word in address 05 designate the Poll Operation, and bits $(g-n)$ of the word in address 06 designated the address of the Extension Unit EU to be polled, the latter decimally indicating Unit No. 10. Accordingly, Extension Unit No. 10 will receive the "Poll" command, e.g., via line 60, FIG. 5.

The polled Extension Unit will now respond in accordance with Table 9 above as to whether or not it is connected in the data processing system, and whether or not it is available for data processing. The former condition is indicated by the status of its flip-flop $FF_2$ (FIG. 5) and is communicated to the Master Data Processor MDP via line NAK, and the latter condition is indicated by the status of its flip-flop $FF_b$ and is communicated via line ACK. In our example, NAK = 1 if the polled Extension Unit is connected in the data processing system, and ACK = 1 if it is available for data processing.

The foregoing NAK and ACK signals, together with the coincidence signal >< designating whether or not the conditions of the previous Poll Instruction have been met, are routed via gate $G_{11}$ to the Flag COmparison Registers $CR_o$, $CR_1$ and $CR_2$. Now, for purposes of our example, take the following case:

a. polling conditions "true", therefore >< = 1 and $CR_2 = 1$;

b. polled Extension Unit not available, therefore ACK = 0 and $CR_1 = 0$;

c. polled Extension Unit not connected, therefore NAK = 0 and $CR_o = 0$.

This is the condition of registers $CR_2$, $CR_1$, $CR_o$ at the completion of the Poll Instruction, i.e. when the Instruction Register IR of the Master Data Processor MDP has been incremented to address 07 in the above illustrative sequence.

Addresses 07 and 08 contain a two-word Select Instruction, in which (see Table 10 above) bits $(a-f)$ of the word in address 07 specify the conditions to be met for executing the instruction, bits $(g-n)$ in address 07 specify the specific Select Operation, bits $(j-n)$ in address 08 specify the selected Extension Unit, and bits $(a-h)$ specify the selected address of its Instruction Register.

The Select Instruction of addresses 07 and 08 thus specifies (per Table 10) that if the conditions of the assigned flags ($CR_o$, $CR_1$, $CR_2$) are all 1, then select Extension Unit No. 10 at address 25 of its Instruction Register. In this case, the Select Instruction designated in the operation portion of the instruction (bits $g-n$, of word 07) is a Select and Transfer Control Operation, commanding the activation of the selected Extension Unit and the transfer of control to it.

In our example, however, the Select Instruction will not be executed because the unmasked association-field bits $(a-c)$ specify that the Flag Comparison Registers $CR_o$, $CR_1$, $CR_2$ must all be 1, whereas the actual case is that $CR_1 = 0$ since the polled Extension Unit was not connected in the data processing system. Accordingly, the Select Instruction of addresses 07 and 08 is not executed, and the Master Data Processor MDP continues to the next instruction, appearing in address 09.

Addresses 09 and 10 constitute another two-word Poll Instruction, but in this case it is an unconditional one since all the association-field bits are masked by the masking-field bits. The Extension Unit to be polled as specified in this Poll Instruction (namely by bits $g-n$ of word 10) is No. 15.

Assuming that Extension Unit No. 15 is connected and is available for data processing, its ACK and NAK responses will both be 1. Also, since the Poll Instruction was an unconditional one, the >< signal will also be 1. Thus, the condition of the Flag Comparison Registers will be $CR_2 = 1$, $CR_1 = 1$ and $CR_o = 1$.

The instructions at addresss 11 and 12 together constitute a two-word Select and Keep Control Instruction, conditional upon a match between the association-field bits $(a-c)$ of word 11 and the condition of Registers $CR_2$, $CR_1$ and $CR_o$. In this case there is a match, and therefore the Select Instruction is executed. Bits $j-n$ of word 12 specify Extension Unit No. 15, and bits $a-h$ of word 12 specify IC address No. 35. Accordingly, in executing the Select Instruction, Extension Unit No. 15 will be activated at its Instruction Register address (IC) No. 35.

The operation-field portion of this Select Instruction (bits $g-n$, word 11) designates a Select and Keep Control Operation. Accordingly, when the Master Data Processor MDP activates the selected Extension Unit EU at its selected IC address, the Master Data Processor will retain control. The Extension Unit will thereupon continue to operate under its own control and will sequentially read out for execution the instructions in its own internal memory, while the master unit continues to operate under its control. This latter example particularly illustrates a multi-processing application of the invention.

It will be appreciated that the foregoing description illustrates merely a preferred embodiment of the invention with several examples of its operation, and that many variations, modifications and other embodiments of the invention can be made.

What is claimed is:

1. Data processing apparatus having the ability to process by association, comprising:
   A. a control unit for receiving instructions and controlling the execution thereof;
   B. flag register means for registering one or more flag criteria;
   C. an instruction register for storing a series of multibit instruction words each including:
      i. an association field of one or more bits designating the one or more flag criteria;
      ii. a masking field of one or more bits for designating the flag criteria to be honored by unmasking the respective association-field bit;
      iii. and an operation field of a plurality of bits for designating a particular data processing operation;
   D. an instruction register addressing means responsive to the control unit for addressing the instruction register to read out the instruction words therefrom;
   E. flag comparator means connected to the control unit for comparing the flag criteria registered in the flag register means with the unmasked association-field bits of each instruction word read out of the instruction register; and
   F. instruction execution means controlled by the control unit to execute the operation designated in the instruction word upon the finding by the comparator means of a match between the unmasked association-field bits of the instruction word and the flag criteria registered in the flag register means.

2. Apparatus according to claim 1, wherein the flag register means (B) includes:
  i. one or more flag bistable devices each conditionable to one of its stable states upon command from an instruction word;
  ii. and one or more flag comparison registers for registering the state of the flag bistable device or devices upon command from another instruction word.

3. Apparatus according to claim 2, wherein the flag register means (B) includes a plurality of n flag comparison registers for registering up to n flag criteria, the association and masking fields of the instruction word each also including n bits, one for each flag criterion.

4. Apparatus according to claim 3, wherein there are a plurality greater than n of flag bistable devices each assignable to one of the flag comparison registers upon command from an instruction word.

5. Apparatus according to claim 3, wherein the instruction execution means (F) comprises a logic decoder and router enabled by the control unit, upon the finding of said match by the comparator means (E), to decode and execute the operation designated in the instruction word; said logic decoder and router including:
  i. means controlling the condition of said flag bistable device upon command from an instruction word;
  ii. and further means for routing the condition of said flag bistable device to the respective flag comparison register upon command from another instruction word.

6. Apparatus according to claim 3, wherein n equals 3, each instruction word including three bits in the association field and three bits in the masking field.

7. Apparatus according to claim 6, wherein each instruction word further includes seven bits in the operation field, the instruction word comprising a total of 13 bits.

8. Apparatus according to claim 1, wherein the instruction register addressing means (D) comprises:
  i. an instruction counter addressed and incremented by the control unit,
  ii. and an instruction decoder decoding the address from the instruction counter and effecting a read-out from the instruction register of the instruction word at the specified address.

9. Apparatus according to claim 1, wherein the flag comparator means (E) comprises:
  i. a comparator for each association bit of the instruction word;
  ii. means inputting into each comparator the respective association bit of the read-out instruction word and the condition of the respective flag comparison register, to produce an output signal indicating a match or non-match between said two inputs;
  iii. a logical OR-gate for each comparator;
  iv. means inputting into each OR-gate the output signal of the respective comparator and the respective bit in the masking field of the read-out instruction word, the latter bit, if designating that the respective association bit is to be masked, producing an overriding output signal from the OR-gate irrespective of the respective association bit;
  v. and a logical AND-gate receiving the output signals of all the comparator OR-gates and producing an output signal to the control unit.

10. Apparatus according to claim 1, wherein the instruction register is a read-only-memory.

11. A data processing system comprising a master data processor apparatus in accordance with claim 1, and one or more extension data processing units;
  the instruction register of the master data processor having means for storing multi-bit instruction words designating a Poll Instruction commanding the poll of a specified extension unit, and a Select Instruction commanding the selection of a specified extension unit;
  each of the extension units including responding means effective upon the execution of a Poll Instruction by the master data processor to register, as the flag criteria in the flag register means of the master data processor, the connection of the polled extension unit and its availability for data processing, thereby enabling the master data processor to execute a subsequent Select Instruction upon the finding by the master data processor flag comparator means of a match between the unmasked association-field bits of a Select Instruction and said flag criteria registered in the flag register means.

12. A system according to claim 11, wherein said responding means of the extension unit includes:
  bistable devices settable to states indicating whether or not the respective extension unit is connected in the system and is available for data processing;
  and means, effective upon the execution of a Poll Instruction by the master data processor, for registering in the flag comparator means of the master data processor, the states of the polled extension unit bistable devices.

13. A system according to claim 11 wherein each extension unit further includes a control unit and an instruction register connected to the control unit for storing its program, and wherein the master data processor includes means effective upon the execution of a Select Instruction to select a specified extension unit and a specified address of the Instruction register thereof.

14. A system according to claim 13, wherein the instruction register of the master data processor includes means for storing a two-word Poll Instruction, one word designating the poll operation, and the other word designating the address of the extension unit to be polled.

15. A system according to claim 14, wherein the instruction register of the master data processor includes means for storing a two-word Select Instruction, one word designating the select operation, and the other word designating the selected extension unit and the selected address of the instruction register thereof.

16. A method of processing data by association, comprising the steps of:
  A. storing a series of multi-bit instruction words each including:
    i. an association field of one or more bits for designating one or more flag criteria;
    ii. a masking field of one or more bits for designating the flag criteria to be honored by unmasking the respective association-field bit, and the flag criteria to be ignored by masking the respective association-field bit;
    iii. an instruction field of a plurality of bits for designating a data processing operation;

one or more of said instruction words designating an operation to register one or more flag criteria;

B. reading out said instruction words in time sequence;

C. registering said one or more flag criteria when the respective instruction word is read out;

D. comparing the registered one or more flag criteria with the unmasked association bits in each instruction word;

E. and executing the operation designated by the instruction word only where there is a match between the unmasked association bits of the respective instruction word and the registered flag criteria.

17. The method according to claim 16, wherein the one or more flag criteria are registered by command of instruction words to condition the state of a plurality of flag bistable devices, and by command of a subsequent instruction word to assign the condition of selected bistable devices to a flag comparison register for comparison with the unmasked association bits in subsequent instruction words.

18. The method according to claim 16, characterized in:

a. including in the series of instruction words stored in step (A), a Poll Instruction commanding the poll of a specified extension unit, and a Select Instruction commanding the selection for activation of a specified extension unit;

b. upon the read-out in step (B), of a Poll Instruction, producing a response indicating whether or not an extension unit specified in the Poll Instruction is connected in the system and whether or not it is available for data processing;

c. registering said response to constitute said one or more flag criteria in step (C);

d. upon the read-out in step (B) of a subsequent Select Instruction, comparing said registered response in step (D) with the unmasked association-field bits of the Select Instruction;

e. and executing in step (E) the Select Instruction upon finding a match between the unmasked association-field bits of the Select Instruction and said registered flag criteria.

19. The method according to claim 17, further characterized in, upon the read-out in step (B) of a Poll Instruction, comparing the registered response in step (D) with the unmasked association-field bits of the Poll Instruction, and executing in step (E) the Poll Instruction upon finding a match between the unmasked association-field bits of the Poll Instruction and said registered flag criteria.

20. The method according to claim 19, wherein each Poll Instruction comprises two multi-bit words; the first word including an association field, a masking field, and an operation field designating the Poll Operation; the second word including an association field, a masking field, and an address field designating the address of the polled extension unit.

21. The method according to claim 18, wherein each Select Instruction comprises two multi-bit words; the first word including an association field, a masking field, and an operation field designating the Select Operation; the second word including a field designating the address of the selected extension unit, and a further field designating the selected address of its instruction register.

22. The method according to claim 21, wherein the Select Operation designated in the operation field of the Select Instruction designates either a Select and Keep Control Operation effective to activate the designated extension unit but to retain control in the master data processor, or a Select and Transfer Control Operation effective to activate the designated extension unit and to transfer control thereto.

23. A method of processing data by means of a master data processor and one or more extension data processing units, the master data processor including flag registering means for registering one or more flag criteria, said method comprising the steps of:

A. storing in the master data processor a series of instruction words each including a Poll Instruction and a Select Instruction, the latter instructions including each a multi-bit word having:

i. an association field of one or more bits designating one or more flag criteria;

ii. a masking field of one or more bits designating the flag criteria to be honored by unmasking the respective association-field bit, and the flag criteria to be ignored by masking the respective association-field bit;

iii. and an operation field of a plurality of bits designating a Poll Operation with respect to a specified extension unit or a Select Operation with respect to a specified extension unit;

B. reading out said instruction words in time sequence;

C. producing from the specified extension unit, upon the read-out of a Poll Instruction specifying same, a response indicating the connection of the specified extension unit in the data processing system and its availability for data processing;

D. registering said response in the flag register means of the master data processor;

E. comparing, upon the read-out of a Select Instruction, said registered response with the unmasked association-field bits of the Select Instruction;

F. and executing the Select Instruction upon finding a match between the unmasked association field bits of the Select Instruction and the registered response in the flag register means.

* * * * *

UNITED STATES PATENT OFFICE
CERTIFICATE OF CORRECTION

PATENT NO. : 4,010,452
DATED : March 1, 1977
INVENTOR(S) : Jean Cazanove

It is certified that error appears in the above-identified patent and that said Letters Patent are hereby corrected as shown below:

Column  6, line 52    "0" should be --∅--;
column  7, line 15    "exeucution" should be --execution--;
column  8, line  7    "0" should be --∅--;
column 18, line 37    "< >" should be -->  <--;
column 23, line 13    "FF$_2$" should be --FF$_a$--;
column 24, line  9    "addresss" should be --addresses--.

Signed and Sealed this

Twentieth Day of December 1977

[SEAL]

Attest:

RUTH C. MASON
Attesting Officer

LUTRELLE F. PARKER
Acting Commissioner of Patents and Trademarks